United States Patent Office 2,733,125
Patented Jan. 31, 1956

2,733,125

RECOVERY OF URANIUM FROM WASTE METAL PRODUCTS

Louis Spiegler, Woodbury, N. J., assignor to the United States of America as represented by the United States Atomic Energy Commission No Drawing. Application October 20, 1944, Serial No. 559,666

5 Claims. (Cl. 23—14.5)

This invention relates to the recovery of uranium from waste metal products containing uranium in the form of metal and metal oxides.

In the manufacture of metallic uranium by reduction of uranium tetrafluoride by more active metals such as magnesium and calcium, portions of the metallic product are obtained unfit for working up into metallic uranium products. This material is normally contaminated with the more active metals and with oxides and fluorides. Also in the working of metallic uranium, by casting, extruding, machining, cutting, and similar operations, scrap metal is frequently formed which is unsuitable for working up into metal articles. Such scrap metal normally consists of metallic uranium coated with oxide and contaminated with small proportions of foreign matter such as calcium, magnesium, iron, carbon, chlorine and fluorine. Such scraps and waste products will hereinafter be designated uranium dross.

The present invention has for objects the conversion of uranium in uranium dross to soluble form and particularly the production of uranyl sulfate solutions from which the uranium can be recovered in a pure form. A further object is the provision of a process permitting rapid solution of uranium as sulfate and separation from insoluble impurities in a prompt and effective manner whereby a uranyl sulfate solution having an especially low content of fluorine can be obtained from fluorine-containing materials. Further objects will appear from the following description of the invention.

The process of my invention converts uranium dross to uranyl sulfate in four steps:

(1) The uranium dross is burned in air at a temperature between 300° and 1000° C.;
(2) The burned dross is roasted with lime in contact with air at a temperature between 600° and 1000° C.;
(3) The roasted product is mixed with sulfuric acid solution; and
(4) The sulfate mixture is treated with an oxidizing agent.

The first step of the process converts metallic uranium to uranyl uranate or uranous uranic oxide, $U_3O_8$, or to a mixture of this oxide and uranous oxide, $UO_2$.

If chlorides are present in the dross, they may be eliminated by adding a small amount of iron oxide or ammonium sulfate in either step (1) or step (2). This treatment forms volatile chlorides which are expelled as vapors at the high temperatures extant in these steps.

The second step of the process converts the various forms of uranium present to calcium uranates. The quantity of lime required will depend upon the quantity of uranium present. In general, the quantity theoretically required to combine with the uranium as the diuranate ($CaU_2O_7$) will be sufficient. Thus the lime should be employed in the ratio of one molecule of lime for each two atoms of uranium. However, the oxidation will proceed in the presence of an excess of either uranium or lime. If an excess of lime is employed, the product may contain the normal calcium uranate ($CaUO_4$) and if a deficiency is employed the product may contain a substantial proportion of the uranium as a higher uranate ($CaO.xUO_3$), such as the tri-, tetra-, or hexa-uranate. The formation of these compounds is not detrimental because they all contain uranium in hexavalent form and possess properties similar to the diuranate.

The third step of the process produces an aqueous solution of uranyl sulfate. A sulfuric acid solution of almost any concentration may be used from very dilute to quite concentrated. The controlling factors are the provision of a sulfate radical for each atom of uranium and calcium and the provision of sufficient water to dissolve the resulting uranyl sulfate. Sulfuric acid solutions of 5% to 50% $H_2SO_4$ concentration are suitable but higher or lower concentrations may be used if desired.

In the fourth step of the process, since the product of the lime roasting process still contains small proportions of less-than-6-valent uranium (in the neighborhood of 5% of the total uranium), sufficient air, hydrogen peroxide, or other active oxidizing agent, such as permanganate chromate, or nitrate, is added to the sulfate solution to oxidize the remainder. I prefer to employ air for oxidation of as much of the residual less-than-6-valent uranium as possible without unduly extending the treatment period. But since this oxidation slows up as the unoxidized uranium content becomes very low, it is usually best to employ a more active oxidizing agent, such as hydrogen peroxide, as a finishing reagent. When the process is carried out in an apparatus constructed of lead or a plastic such as neoprene, hydrogen peroxide is preferred to oxidizing agents such as nitric acid because of its lesser tendency to deteriorate the equipment.

Calcium sulfate formed by the sulfuric acid precipitates out from solution and may be separated by mechanical separation methods, i. e. filtration or decantation. Preferably the pH of the solution is adjusted to between 2 and 4 before effecting the separation. This pH adjustment permits separation of a maximum of the calcium sulfate while leaving all of the uranium in solution. If substantial quantities of iron are present, the iron will be separated along with the calcium.

In the above manner a uranyl sulfate solution containing a low concentration of sulfates other than uranyl sulfate and containing only a few parts per million of iron may be produced suitable for treatment to recover uranium peroxide in accordance with the process described in my U. S. Patent Application Serial No. 559,665.

The following example will illustrate the invention (quantities are expressed as parts by weight):

EXAMPLE

*Part A.—Conversion of uranium to hexavalent form*

A mixture of metallic uranium products obtained as scrap from metal working and as dross from metal melting and pouring operations and containing small quantities of uranium dioxide is "burned" in air at a temperature between 600° C. and 1000° C. to convert the uranium content to uranous uranate, $U_3O_8$. In this form the uranium may be regarded as one-third tetravalent uranium and two-thirds hexavalent uranium. However, continued heating in air alone will not further oxidize the uranium.

124 parts of the roasted product of 81.5% uranium content are mixed with 12.4 parts of powdered lime. The mixture is then passed through a rotary kiln heated externally to an internal temperature between 700° C. and 800° C. The passage of the material through the kiln is regulated so that it is retained in the kiln for a period of about 3 hours. During this period air is continually passed through the rotating kiln and the charge gradually becomes orange or yellow.

About 136 parts of a calcium diuranate ($CaU_2O_7$) product are recovered containing about 98 parts of hexavalent uranium and less than 3 parts of tetravalent uranium.

*Part B.—Conversion of uranium to uranyl sulfate*

The 136 parts of the product of Part A are ground to pass a 200 mesh screen and are then added to 713 parts of aqueous 15½% $H_2SO_4$ solution at 85–90° C. in a lead-lined vessel. The mixture is agitated with air for 2 hours at 90–95° C. 6 parts of aqueous 27½% hydrogen peroxide are added, and the charge is agitated at 90–95° C. for another hour. The pH of the solution is lowered to about 0.5 to 0.6 by this treatment. About 80 parts of finely powdered calcium carbonate ($CaCO_3$) are added slowly over a period of two hours to adjust the pH to 3.7 and the mixture is held for ¾ hour at 90–95° C., further pH adjustment being made as necessary to maintain the solution at an approximately constant pH. The maintenance of a high temperature at the specified pH affords an opportunity for iron to precipitate and coagulate so that an iron-free solution may be obtained. The precipitate is then separated by filtration from the aqueous solution of uranyl sulfate. The aqueous uranyl sulfate solution may be used directly for the production of uranium peroxide as described below.

*Part C.—Recovery of uranium as uranium peroxide*

To the filtrate product of Part B are added 79 parts of ammonium sulfate and the pH is adjusted to about 3.0 by addition of dilute $H_2SO_4$. The product is cooled to 40° C. and filtered free of any precipitate. 63 parts of aqueous 27½% hydrogen peroxide solution are added slowly in a one to two hour period and the pH is readjusted from about 1.5 to 3.0 by addition of about 53 parts of aqueous ammonium hydroxide solution (28% $NH_3$) over a two hour period. The charge is agitated at a pH of 3.0 and at a temperature of 40–45° C. until the precipitation of the peroxide is complete as indicated by testing the aqueous mother liquor for uranium by the potassium ferrocyanide test. Approximately 142 parts (dry weight) of uranium peroxide are separated from aqueous mother liquor by filtration, corresponding to a 99% yield of uranium from the initial material of Part A.

It will be understood that I intend to include variations and modifications of the invention and the preceding example is illustrative only and in no wise to be construed as a limitation upon the invention, the scope of which is defined in the appended claims, wherein I claim:

1. The method for producing an aqueous uranyl sulfate solution from uranium metal dross, which comprises burning the dross in air to convert uranium metal to oxides of uranium, mixing the oxides of uranium with lime, roasting the mixture in air at a temperature between 600° C. and 1000° C., mixing the product with at least sufficient sulfuric acid to supply one sulfate radical for each atom of calcium and uranium in the mixture, and adding an oxidizing agent to convert residual less-than-6-valent uranium to hexavalent form.

2. The method for producing an aqueous uranyl sulfate solution from uranium metal dross, which comprises burning the dross in air to convert uranium metal to oxides of uranium, mixing the oxides of uranium with lime, roasting the mixture in air at a temperature between 600° C. and 1000° C., mixing the product with at least sufficient aqueous 5% to 50% $H_2SO_4$ solution to supply one sulfate radical for each atom of calcium and uranium in the mixture, adding an oxidizing agent to convert residual less-than-6-valent uranium to hexavalent form, and mechanically separating solid matter from the resulting aqueous uranyl sulfate solution.

3. The method for producing an aqueous uranyl sulfate solution from uranium metal dross, which comprises burning the dross in air to convert uranium metal to oxides of uranium, mixing the oxides of uranium with lime, roasting the mixture in air at a temperature between 600° C. and 1000° C., mixing the product with at least sufficient aqueous 5% to 50% $H_2SO_4$ solution to supply one sulfate radical for each atom of calcium and uranium in the mixture, adding an oxidizing agent to convert residual less-than-6-valent uranium to hexavalent form, adjusting the pH of the solution to a value between 2 and 4, an mechanically separating solid matter from the resulting aqueous uranyl sulfate solution.

4. The method for producing an aqueous uranyl sulfate solution from uranium metal dross, which comprises burning the dross in air to convert uranium metal to oxides of uranium, mixing the oxides of uranium with lime, roasting the mixture in air at a temperature between 600° C. and 1000° C., mixing the product with at least sufficient aqueous 5% to 50% $H_2SO_4$ solution to supply one sulfate radical for each atom of calcium and uranium in the mixture, aerating the solution, adding a peroxide to convert residual less-than-6-valent uranium to hexavalent form, and mechanically separating solid matter from the resulting aqueous uranyl sulfate solution.

5. The method for producing an aqueous uranyl sulfate solution from uranium metal dross, which comprises burning the dross in air to convert uranium metal to oxides of uranium, mixing the oxides of uranium with lime, roasting the mixture in air at a temperature between 600° C. and 1000° C., mixing the product with at least sufficient aqueous 5% to 50% $H_2SO_4$ solution to supply one sulfate radical for each atom of calcium and uranium in the mixture, aerating the solution, adding a peroxide to convert residual less-than-6-valent uranium to hexavalent form, adjusting the pH of the solution to a value between 2 and 4, and mechanically separating solid matter from the resulting aqueous uranyl sulfate solution.

No references cited.